(12) United States Patent (10) Patent No.: US 12,562,932 B2

Yokoyama (45) Date of Patent: Feb. 24, 2026

(54) VEHICLE-MOUNTED TERMINAL DEVICE

(71) Applicant: Honda Motor Co., Ltd., Tokyo (JP)

(72) Inventor: Hajime Yokoyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 18/418,354

(22) Filed: Jan. 22, 2024

(65) Prior Publication Data

US 2024/0313993 A1      Sep. 19, 2024

(30) Foreign Application Priority Data

Mar. 13, 2023 (CN) .......................... 202310236653.9

(51) Int. Cl.
| | |
|---|---|
| *H04L 12/18* | (2006.01) |
| *G06V 10/75* | (2022.01) |
| *G06V 10/77* | (2022.01) |
| *G06V 20/20* | (2022.01) |
| *G06V 20/40* | (2022.01) |
| *G06V 20/56* | (2022.01) |
| *H04L 65/1089* | (2022.01) |

(52) U.S. Cl.
CPC ........ *H04L 12/1831* (2013.01); *G06V 10/757* (2022.01); *G06V 10/7715* (2022.01); *G06V 20/20* (2022.01); *G06V 20/46* (2022.01); *G06V 20/56* (2022.01); *H04L 65/1089* (2013.01)

(58) Field of Classification Search
CPC . H04L 12/1831; H04L 65/1089; G06V 20/20; G06V 10/7715; G06V 20/46; G06V 10/757; G06V 20/56
See application file for complete search history.

(56) References Cited

U.S. PATENT DOCUMENTS

| | | | | |
|---|---|---|---|---|
| 11,233,974 B1 * | 1/2022 | Adcock | ................. | H04N 7/157 |
| 11,787,342 B2 * | 10/2023 | Solar | ................. | H04N 21/4788 |
| | | | | 348/148 |
| 2006/0215589 A1 * | 9/2006 | Taborisskiy | ........... | H04N 7/141 |
| | | | | 348/E7.078 |
| 2020/0213560 A1 * | 7/2020 | Zhang | ................... | G06V 40/70 |

(Continued)

FOREIGN PATENT DOCUMENTS

| | | | | |
|---|---|---|---|---|
| CN | 117201720 A | * 12/2023 | ......... | H04N 21/4788 |

*Primary Examiner* — Olisa Anwah

(74) *Attorney, Agent, or Firm* — JCIPRNET

(57) ABSTRACT

The disclosure provides a vehicle-mounted terminal device which can improve the conference quality of video conferences. The vehicle-mounted terminal device is installed on a vehicle and configured to conduct an electronic conference with other terminal devices. The vehicle-mounted terminal device includes a capturing device, a current position obtaining device, an associated image obtaining device, and a communication device. The capturing device is configured to capture an image of a passenger in the vehicle. The current position obtaining device is configured to obtain a current position of the vehicle. The associated image obtaining device is configured to obtain a current position associated image associated with the current position obtained through the current position obtaining device. The communication device is configured to send a passenger image captured by the capturing device and the current position associated image obtained through the associated image obtaining device to other terminal devices.

12 Claims, 3 Drawing Sheets

(56)                    References Cited

U.S. PATENT DOCUMENTS

| | | | |
|---|---|---|---|
| 2023/0093198 A1* | 3/2023 | Szelest | G06V 20/41 |
| | | | 709/204 |
| 2023/0104622 A1* | 4/2023 | Schubert | H04N 23/633 |
| | | | 348/14.03 |
| 2023/0117301 A1* | 4/2023 | Olivieri | H04L 65/403 |
| | | | 348/14.07 |
| 2023/0138424 A1* | 5/2023 | Oh | H04N 7/15 |
| | | | 348/14.08 |
| 2023/0421719 A1* | 12/2023 | Zhu | H04N 5/272 |

* cited by examiner

M

100

100

Current position obtaining device    120

CP

Associated image obtaining device    130

Img2

Capturing device    110

Img1

Communication device    140

Map

CP

400

VEHICLE-MOUNTED TERMINAL DEVICE

CROSS-REFERENCE TO RELATED APPLICATION

This application claims the priority benefit of China application serial no. 202310236653.9, filed on Mar. 13, 2023. The entirety of the above-mentioned patent application is hereby incorporated by reference herein and made a part of this specification.

BACKGROUND

Technical Field

The disclosure relates to a terminal device, and in particular to a vehicle-mounted terminal device installed on a vehicle.

Description of Related Art

In recent years, efforts have been active to provide access to sustainable transportation systems that also take into account vulnerable persons such as the elderly, disabled people, and children among transportation participants. In order to achieve part of or all of the above-mentioned purpose or other purposes, we are committed to research and development that further improves the safety or convenience of transportation through research and development related to the livability of vehicles.

In terms of the livability of vehicles, the conventional electronic conference system installed on the vehicle allows the selection of background images, but merely provides fixed backgrounds as options, which is not based on a premise that a conference-participant is moving. Therefore, it is impossible to visually tell whether the participant is moving during the conference, and there are issues such as "requesting a participant who is driving and cannot respond to answer a question" and "continuing to speak to a participant who is driving in a mountainous area with a poor signal condition, and then when the speaking is finished, realizing that the participant did not hear at all" that need to be solved.

SUMMARY

The disclosure aims to improve the quality of video conferencing, which in turn contributes to the development of sustainable transportation systems.

The disclosure provides a vehicle-mounted terminal device, which is installed on a vehicle and configured to be able to conduct an electronic conference with other terminal devices. The vehicle-mounted terminal device includes a capturing device, a current position obtaining device, an associated image obtaining device, and a communication device. The capturing device is configured to capture an image of a passenger in the vehicle. The current position obtaining device is configured to obtain a current position of the vehicle. The associated image obtaining device is coupled to the current position obtaining device and is configured to obtain a current position associated image associated with the current position obtained through the current position obtaining device. The communication device is coupled to the capturing device and the associated image obtaining device and is configured to send a passenger image captured by the capturing device and the current position associated image obtained through the associated image obtaining device to other terminal devices.

Based on the above, the vehicle-mounted terminal device of the disclosure can obtain information associated with the current position and change the personal background image in the electronic conference according to the feature (mountainous area, riverside, seaside, etc.) of the location. Therefore, through visually communicating whether the participant is moving during the conference, situations such as "requesting a participant who is driving and cannot respond to answer a question" and "continuing to speak to a participant who is driving in a mountainous area with a poor signal condition, and then when the speaking is finished, realizing that the participant did not hear at all" can be avoided, thereby the quality of the conference is improved.

In order to make the above-mentioned features and advantages of the disclosure more comprehensible, the following embodiments are described in detail with reference to the accompanying drawings.

DESCRIPTION OF THE EMBODIMENTS

Figure 1:
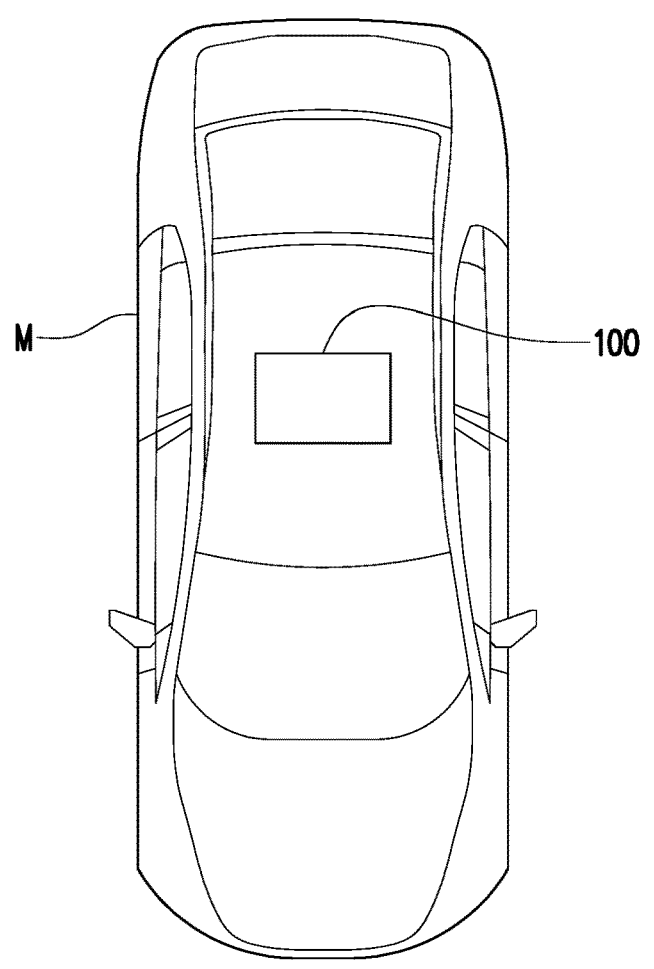
FIG. 1 is a schematic diagram showing a vehicle installed with a vehicle-mounted terminal device according to an embodiment of the disclosure.

Reference will now be made in detail to the exemplary embodiments of the disclosure, examples of the exemplary embodiments are illustrated in the accompanying drawings. Whenever possible, the same reference numerals are used in the drawings and description to refer to the same or similar parts.

In an embodiment of the disclosure, the communication device combines the current position associated image and the passenger image into a background image and send to other terminal devices.

In an embodiment of the disclosure, the associated image obtaining device analyzes a surrounding feature of the current position according to the current position and obtains an image matching the surrounding feature as the current position associated image.

In an embodiment of the disclosure, the associated image obtaining device determines whether the vehicle is in a stationary state or a moving state. If the vehicle is in the moving state, then the associated image obtaining device obtains a traveling video clip as the current position associated image.

In an embodiment of the disclosure, the traveling video clip serving as the current position associated image is a traveling video clip captured by another vehicle that previously traveled at the current position of the vehicle.

In an embodiment of the disclosure, the traveling video clip serving as the current position associated image is a real-time surrounding image of the current position of the vehicle.

Figure 2:
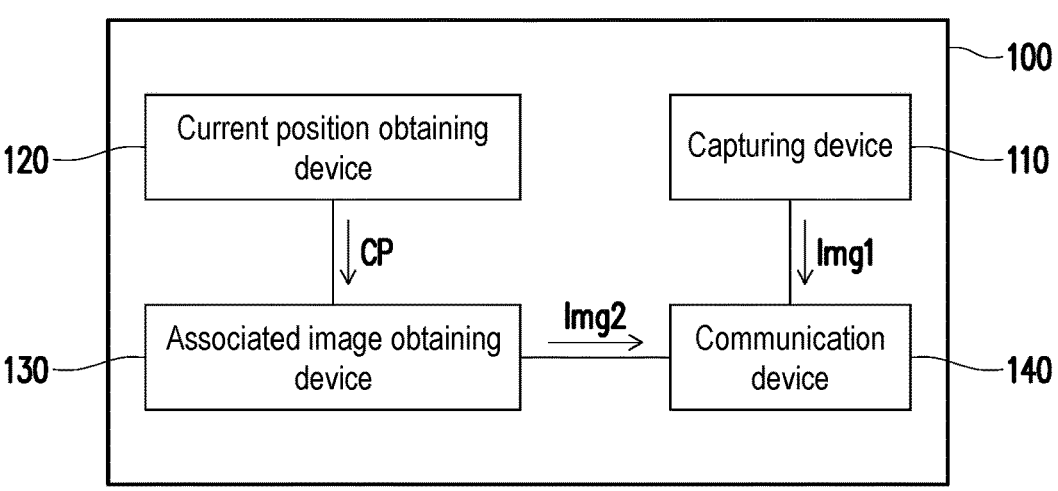
FIG. 2 is a schematic block diagram of a vehicle-mounted terminal device according to an embodiment of the disclosure.

FIG. 1 is a schematic diagram showing a vehicle installed with a vehicle-mounted terminal device according to an embodiment of the disclosure, and FIG. 2 is a schematic block diagram of a vehicle-mounted terminal device according to an embodiment of the disclosure. Please refer to FIG. 1 together with FIG. 2. A vehicle-mounted terminal device 100 is installed on a vehicle M and is configured to communicate with other terminal devices in different locations through a communication paths such as the network, thereby an electronic conference (a video conference) is conducted in an online manner. The vehicle M is, for example, a two-wheeled, three-wheeled, or four-wheeled vehicle and includes, for example, a vehicle that uses an internal combustion engine such as a diesel engine or a gasoline engine as a power source, an electric vehicle that uses an electric motor as a power source, and a hybrid vehicle that uses both an internal combustion engine and an electric motor. The electric vehicle is driven by using an electric power discharged from a battery such as a secondary battery, a hydrogen fuel cell, a metal fuel cell, and an ethanol fuel cell.

As shown in FIG. 2, the vehicle-mounted terminal device 100 is, for example, an electronic device such as a personal computer (PC), a tablet PC, a smartphone, or a mobile phone, which has the function of sending and receiving data to and from other terminal devices. The vehicle-mounted terminal device 100 includes a capturing device 110, a current position obtaining device 120, an associated image obtaining device 130, and a communication device 140. The capturing device 110 may be configured to capture an image of a passenger in the vehicle M. For example, when the passenger in the vehicle M is to participate in the electronic conference (the video conference) while the vehicle M is traveling, the passenger participating in the conference can be photographed by the capturing device 110 to obtain a designated passenger image Img1 (for example, a static or dynamic face image of a certain size). The capturing device 110 is, for example, one or more cameras, three-dimensional cameras, or other similar devices or a combination of the above devices.

The current position obtaining device 120 is, for example, a Global Positioning System (GPS) locator having a GPS positioning function, which may be used to obtain a current position CP (for example, two-dimensional coordinates or three-dimensional coordinates calibrated based on the position of the origin of the earth coordinate system) of the vehicle M and send the obtained current position CP to the associated image obtaining device 130.

The associated image obtaining device 130 is coupled to the current position obtaining device 120. The associated image obtaining device 130 is, for example, a central processing unit (CPU), or other programmable general-purpose or special-purpose microprocessors, a digital signal processor (DSP), a programmable controller, an application specific integrated circuit (ASIC), or other similar components or a combination of the above components, which may be used to obtain a current position associated image Img2 associated with the current position CP obtained through the current position obtaining device 120. Specifically, the associated image obtaining device 130 can analyze a surrounding feature (mountainous area, riverside, seaside, etc.) of the current position CP of the vehicle M based on the current position CP and obtain an image matching the surrounding feature as the current position associated image Img2. For example, when the coordinates of the current position CP of the vehicle M indicate that the vehicle M is located in a mountainous area, the associated image obtaining device 130 can obtain an image that matches the mountainous scene through the Internet (for example, a related image of the mountainous area where the current vehicle M is located that can be searched on the Internet or any image that visually allows people to know that the participant is in a mountainous area) to serve as the current position associated image Img2. Similarly, when the coordinates of the current position CP of the vehicle M indicate that the vehicle M is located at a riverside or seaside, the associated image obtaining device 130 can also obtain an image that matches the riverside or seaside scene through the Internet to serve as the current position associated image Img2. In addition to using the Internet, in some embodiments, the associated image obtaining device 130 may also directly retrieve an image that matches the surrounding feature from a built-in database of the vehicle-mounted terminal device 100.

In addition, the associated image obtaining device 130 may also determine whether the vehicle M is in a stationary state or a moving state based on vehicle speed information from a vehicle speed sensor. If the vehicle M is in the moving state, then the associated image obtaining device 130 obtains a traveling video clip as the current position associated image. The traveling video clip may be, for example, a real-time surrounding image (mainly the front of the vehicle, but may also be the rear and both sides of the vehicle) of the current position CP of the vehicle M captured by a dashcam installed on the vehicle M, or may be a traveling video clip captured by another vehicle that previously traveled at the current position CP of the vehicle M.

The communication device 140 is coupled to the capturing device 110 and the associated image obtaining device 130. The communication device 140 may support, for example, various wireless communication standards such as cellular net or Wireless Fidelity (Wi-Fi) network, Bluetooth (registered trademark), and dedicated short range communication (DSRC), and can connect to other terminal devices through wireless communication. During the electronic conference, the communication device 140 may be configured to send the passenger image Img1 captured by the capturing device and the current position associated image Img2 obtained through the associated image obtaining device 130 to other terminal devices, so that participants on other terminal devices visually understand the environment in which the passenger participating in the conference on the vehicle M is located fully.

In addition, the communication device 140 may also combine the current position associated image Img2 and the passenger image Img1 into a background image and send to other terminal devices. In this way, during the electronic conference, the passenger participating in the conference on the vehicle M may change the personal background image in the electronic conference according to the feature (mountainous area, riverside, seaside, etc.) of the current position. Therefore, through visually communicating the moving state and the location of the participant during the conference, the quality of the electronic conference is improved.

In order to describe in detail the implementation of the electronic conference in this embodiment, please refer to FIG. 3A and FIG. 3B for description below.

Figure 3A:
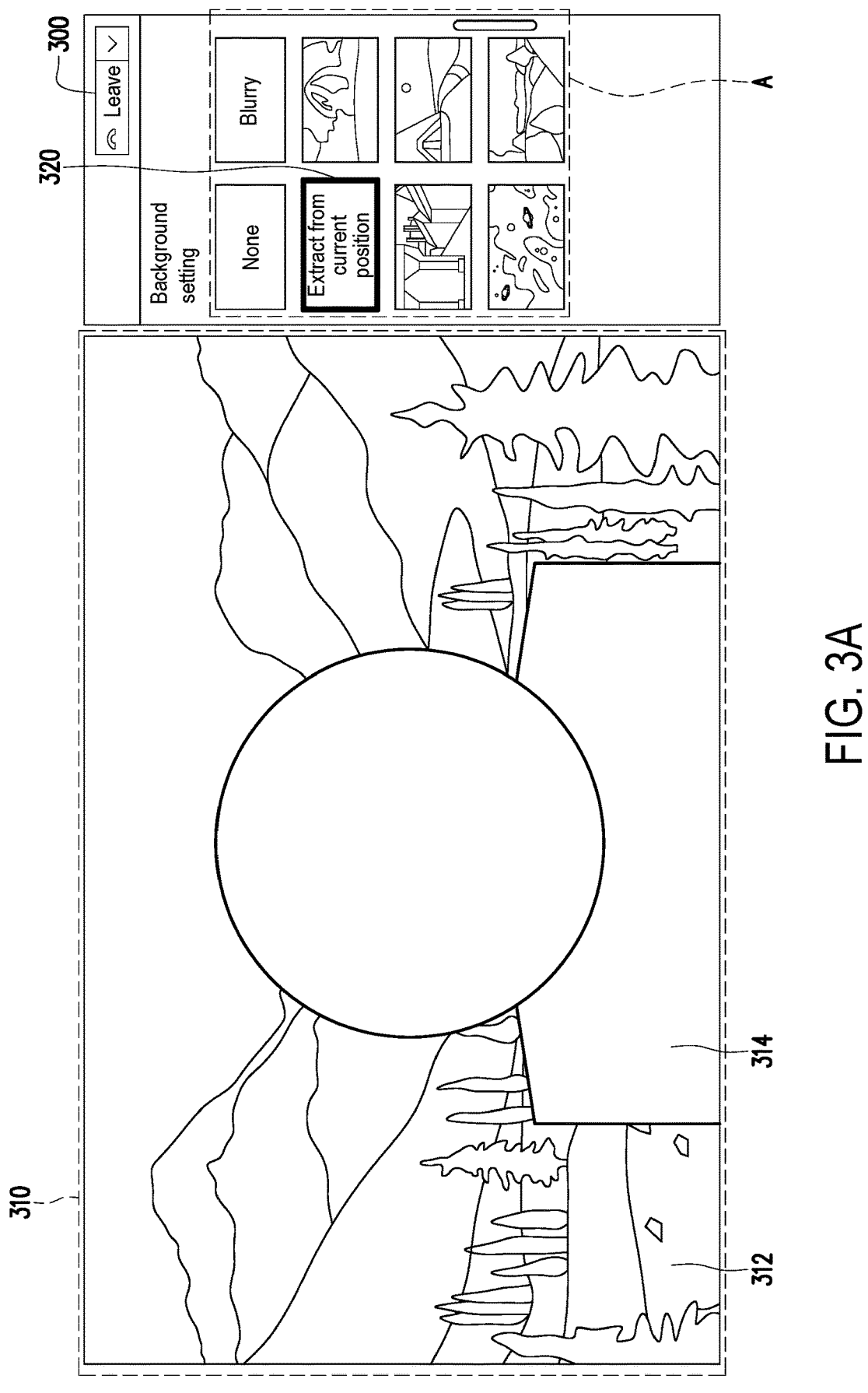
FIG. 3A and FIG. 3B are illustrative examples of an electronic conference according to an embodiment of the disclosure.
Figure 3B:
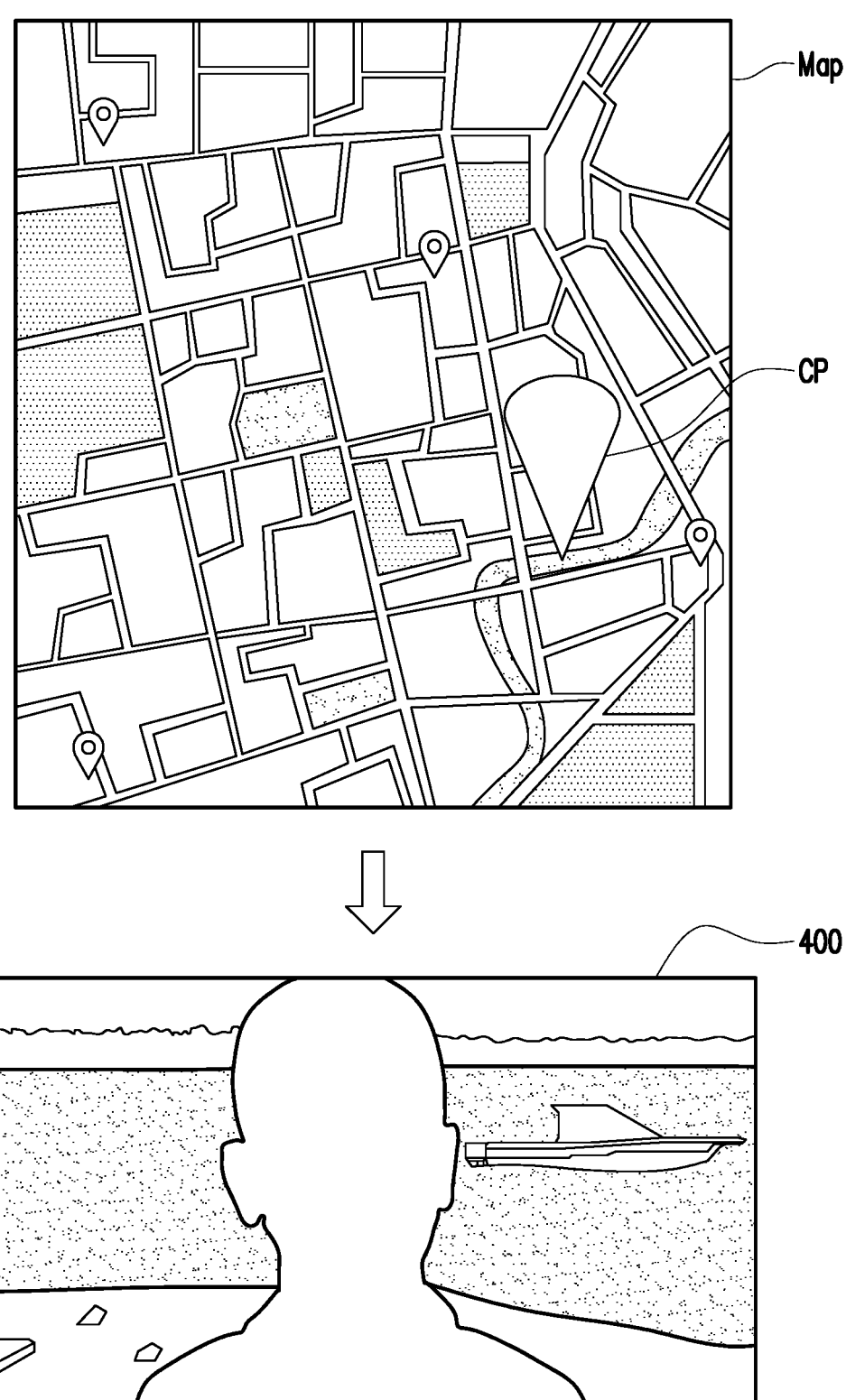

FIG. 3A and FIG. 3B are illustrative examples of an electronic conference according to an embodiment of the disclosure. A video interface 300 for an electronic conference is shown in FIG. 3A. A background image 310 is displayed on the left side of the video interface 300. The background image 310 comprises a background image 312 and an avatar image 314. A plurality of background options that can be selected as the background image 312 are listed in an area A on the right side of the video interface 300. Among the multiple background options is an "extract from current position" background option 320. During the electronic conference, the passenger participating in the conference on the vehicle M may select a desired background option to be seen by participants on other terminal devices. When the associated image obtaining device 130 receives the selection operation from the passenger participating in the conference on the vehicle M through an input device (such as a cursor, a touchpad, or a touch panel with resistive, capacitive, or other types of touch sensing components) of the vehicle-mounted terminal device 100, when the "extract from current position" background option 320 is selected from the listed multiple background options, the communication device 140 may use the current position associated image Img2 as the background image 312 and the passenger image Img1 as the avatar image 314 and combine the two images into the background image 310 to send to the other terminal device. In addition, the current position obtaining device 120 of the vehicle-mounted terminal device 100 may obtain the current position CP of the vehicle M through the global positioning system. As shown in FIG. 3B, the current position CP displayed on a positioning system map Map is located at a riverside. At this time, the associated image obtaining device 130 may obtain an image matching the riverside scene through the Internet, and the communication device 140 may combine the image matching the riverside scene onto a background image 400 sent to other terminal devices, thereby allowing participants on other terminal devices to know that the passenger participating in the conference on the vehicle M is located in a riverside environment.

Based on the above, the vehicle-mounted terminal device of the disclosure can obtain information associated with the current position and change the personal background image in the electronic conference according to the feature (mountainous area, riverside, seaside, etc.) of the location. Therefore, through visually communicating the moving state and the location of the participant during the conference, the quality of the conference is improved, which in turn contributes to the development of sustainable transportation systems.

Finally, it should be noted that the above embodiments are merely used to illustrate the technical solution of the disclosure, but not to limit the disclosure. Although the disclosure has been described in detail with reference to the embodiments, it should be understood that persons of ordinary skill in the art can still modify the technical solutions recorded in the embodiments or make equivalent substitutions for some or all of the technical features. However, the modifications or substitutions do not cause the essence of the corresponding technical solution to depart from the scope of the technical solution of the embodiments of the disclosure.

What is claimed is:

1. A vehicle-mounted terminal device installed on a vehicle and configured to be able to conduct an electronic conference with other terminal devices, comprising:
   a capturing device configured to capture an image of a passenger in the vehicle;
   a current position obtaining device configured to obtain a current position of the vehicle;
   an associated image obtaining device coupled to the current position obtaining device and is configured to obtain a current position associated image associated with the current position obtained through the current position obtaining device; and
   a communication device coupled to the capturing device and the associated image obtaining device and configured to send a passenger image captured by the capturing device and the current position associated image obtained through the associated image obtaining device to the other terminal devices,
   wherein the associated image obtaining device determines whether the vehicle is in a stationary state or a moving state, and if the vehicle is in the moving state, then a traveling video clip is obtained and served as the current position associated image.

2. The vehicle-mounted terminal device as claimed in claim 1, wherein the communication device combines the current position associated image and the passenger image into a background image and send to the other terminal devices.

3. The vehicle-mounted terminal device as claimed in claim 1, wherein the associated image obtaining device analyzes a surrounding feature of the current position according to the current position and obtains an image matching the surrounding feature as the current position associated image.

4. The vehicle-mounted terminal device as claimed in claim 2, wherein the associated image obtaining device analyzes a surrounding feature of the current position according to the current position and obtains an image matching the surrounding feature as the current position associated image.

5. The vehicle-mounted terminal device as claimed in claim 1, wherein the traveling video clip serving as the current position associated image is a traveling video clip captured by another vehicle that previously traveled at the current position of the vehicle.

6. The vehicle-mounted terminal device as claimed in claim 1, wherein the traveling video clip serving as the current position associated image is a real-time surrounding image of the current position of the vehicle.

7. A vehicle, comprising:
   the vehicle-mounted terminal device as claimed in claim 1.

8. A vehicle, comprising:
   the vehicle-mounted terminal device as claimed in claim 2.

9. A vehicle, comprising:
   the vehicle-mounted terminal device as claimed in claim 3.

10. A vehicle, comprising:
   the vehicle-mounted terminal device as claimed in claim 4.

11. A vehicle, comprising:
   the vehicle-mounted terminal device as claimed in claim 5.

12. A vehicle, comprising:
   the vehicle-mounted terminal device as claimed in claim 6.

* * * * *